(No Model.)　　　　　　　　　　　　　　　　5 Sheets—Sheet 1.
A. D. ELLIOTT & C. W. GLIDDEN.
J. E. GLIDDEN, Administrator of C. W. GLIDDEN, Deceased.
NAIL ASSORTING AND DISTRIBUTING APPARATUS.
No. 577,241.　　　　　　　　　　　　Patented Feb. 16, 1897.
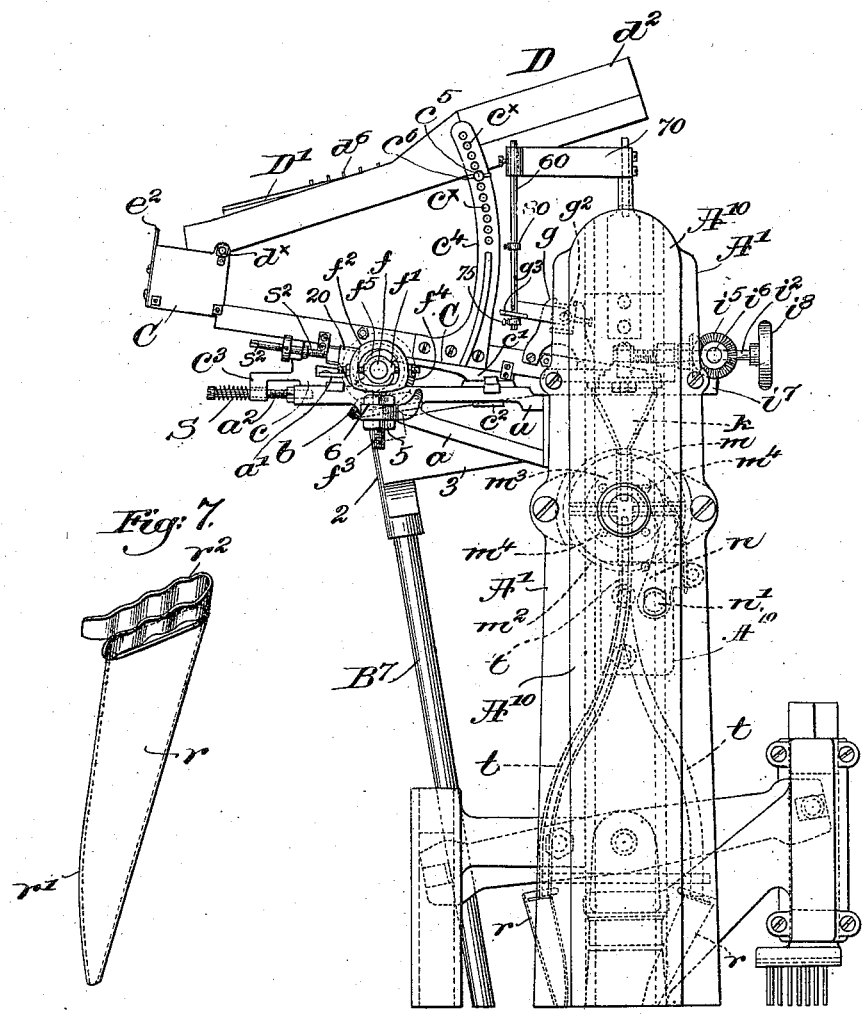

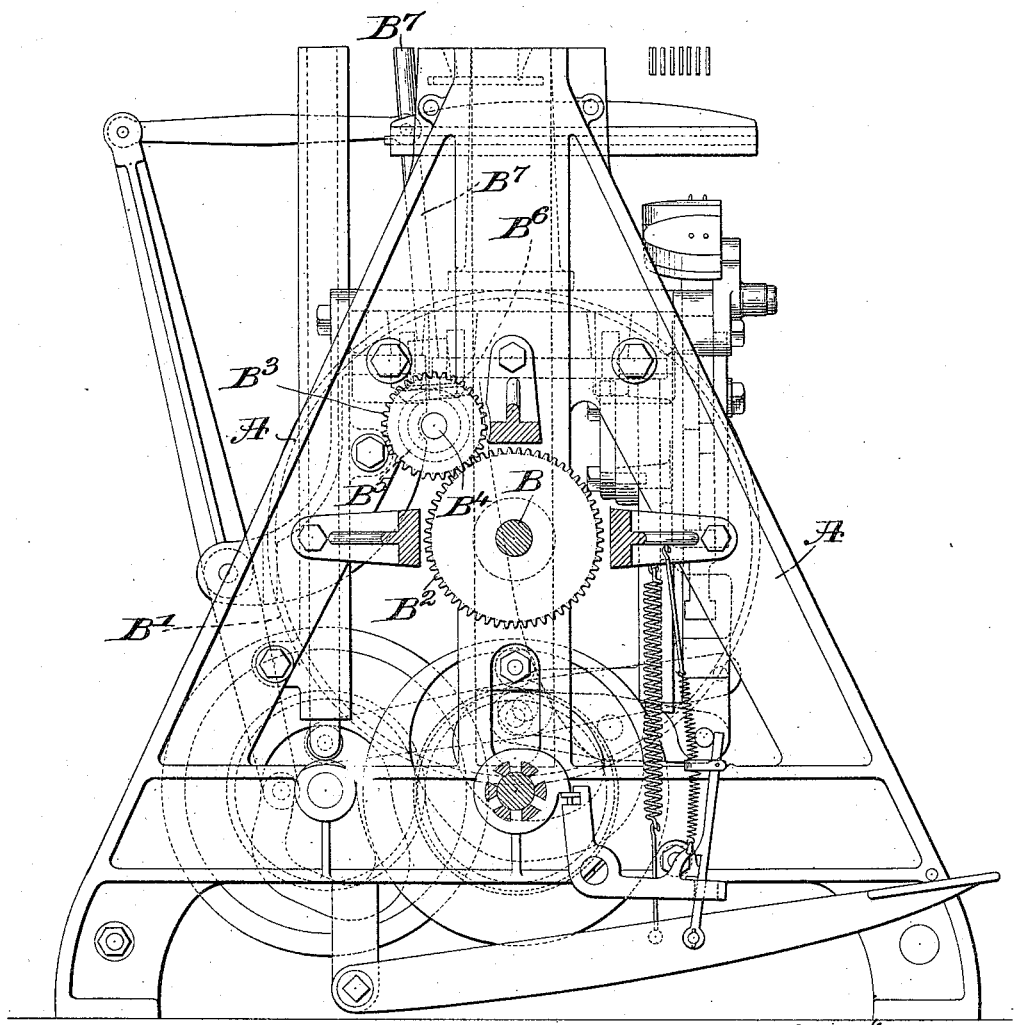

(No Model.) 5 Sheets—Sheet 3.
A. D. ELLIOTT & C. W. GLIDDEN.
J. E. GLIDDEN, Administrator of C. W. GLIDDEN, Deceased.
NAIL ASSORTING AND DISTRIBUTING APPARATUS.
No. 577,241. Patented Feb. 16, 1897.
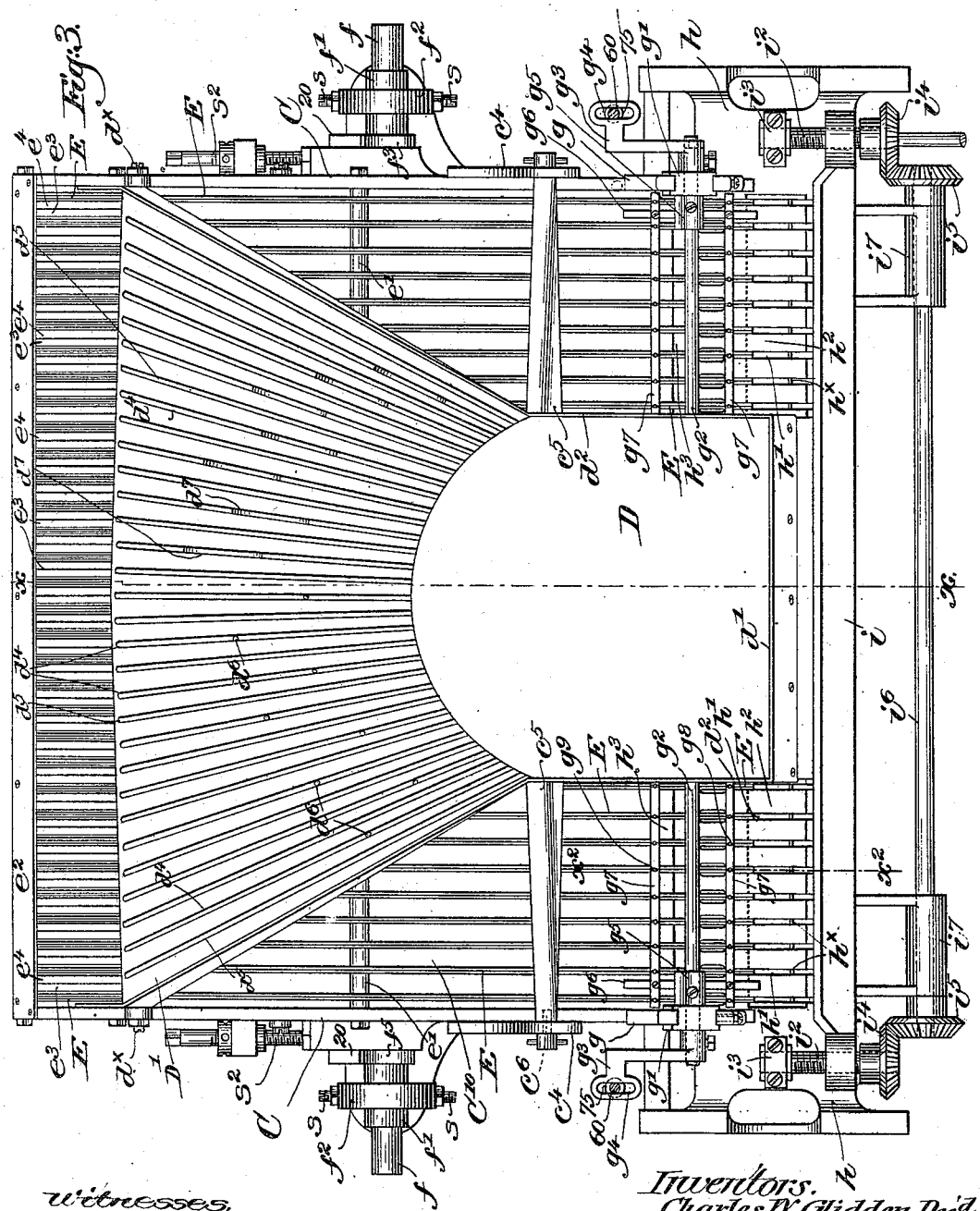
Witnesses.
Fred S. Greenleaf.
John F. C. Preinkert.
Inventors.
Charles W. Glidden Dec'd.
John E. Glidden Adm'r.
Alvin D. Elliott.
By Crosby Gregory attys.

(No Model.) 5 Sheets—Sheet 4.
A. D. ELLIOTT & C. W. GLIDDEN.
J. E. GLIDDEN, Administrator of C. W. GLIDDEN, Deceased.
NAIL ASSORTING AND DISTRIBUTING APPARATUS.
No. 577,241. Patented Feb. 16, 1897.
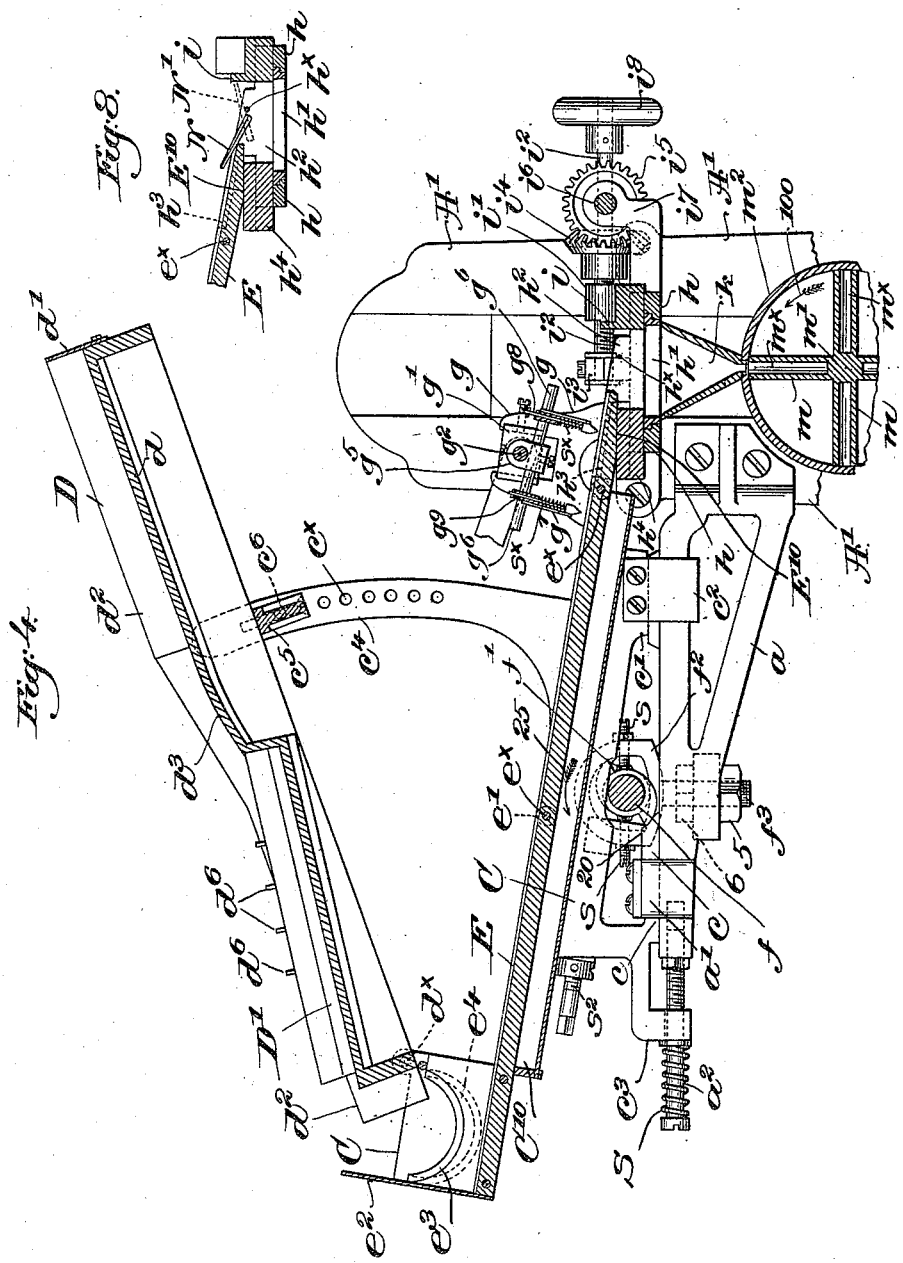

(No Model.) 5 Sheets—Sheet 5.
A. D. ELLIOTT & C. W. GLIDDEN.
J. E. GLIDDEN, Administrator of C. W. GLIDDEN, Deceased.
NAIL ASSORTING AND DISTRIBUTING APPARATUS.
No. 577,241. Patented Feb. 16, 1897.
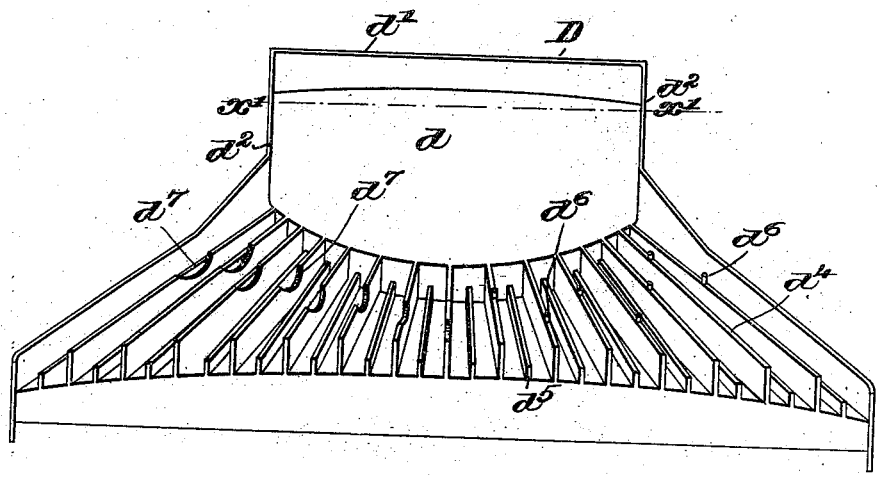
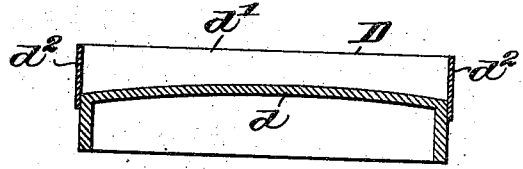

UNITED STATES PATENT OFFICE.

ALVIN D. ELLIOTT, OF LAWRENCE, MASSACHUSETTS, AND JOHN E. GLIDDEN, ADMINISTRATOR OF CHARLES W. GLIDDEN, DECEASED, ASSIGNORS TO JAMES W. BROOKS, PRINCIPAL TRUSTEE, OF PETERSHAM, AND JOHN BROOKS, ASSOCIATE TRUSTEE, OF CAMBRIDGE, MASSACHUSETTS.

NAIL ASSORTING AND DISTRIBUTING APPARATUS.

SPECIFICATION forming part of Letters Patent No. 577,241, dated February 16, 1897.

Application filed February 24, 1896. Serial No. 580,403. (No model.)

*To all whom it may concern:*

Be it known that I, ALVIN D. ELLIOTT, of Lawrence, and CHARLES W. GLIDDEN, late of Lynn, county of Essex, State of Massachusetts, deceased, invented an Improvement in Nail Assorting and Distributing Apparatus, of which the following description, in connection with the accompanying drawings, is a specification, like letters on the drawings representing like parts.

This invention has for its object the production of an apparatus in which nails in bulk placed in a suitable hopper may be led therefrom by a series of guideways and be delivered therefrom in series head foremost to a transferrer, the transferrer in turn overturning the nails and directing them with their points foremost into suitable distributing-tubes, from which they are delivered in series to a loading device of any suitable construction. As the nails are placed in the hopper in bulk they will be fed or presented to the guideways both point foremost and head foremost, the guideways being of such shape and construction that the nails are disposed therein in the direction of their length, and suitable means are provided for reversing the nails which leave the guideways point foremost, so that each may enter the transferrer head foremost. The transferrer has many pockets and receives one series of nails after another, and by moving the transferrer the nails are overturned and discharged point foremost in series into distributing-tubes.

Figure 1, in side elevation, represents a nail assorting and distributing apparatus embodying our invention and shown as applied to the upper part of a heel-loading machine. Fig. 2, in side elevation and partly in section, represents most of the lower part of the loading-machine to show the devices for operating the assorting and distributing apparatus. Fig. 3 is an enlarged plan view of the nail assorting and distributing apparatus shown in Fig. 1. Fig. 4 is a sectional view of the assorting and distributing apparatus, taken on the line $x\ x$, Fig. 3, looking to the right. Fig. 5 is a rear end elevation of the hopper and the guide-troughs leading therefrom to the guideways, to be described. Fig. 6 is a transverse section on the line $x'\ x'$, Fig. 5, of the hopper to show the convexity of its bottom. Fig. 7 is a detached perspective view, on a larger scale, of one of the auxiliary distributer-tubes, to be described; and Fig. 8 is a detached sectional view of the positioning device at the delivery ends of the guideways, taken on the line $x^2\ x^2$, Fig. 7.

Referring now to Figs. 1 and 2, the framework A of the nail-loading apparatus herein illustrated is suitably shaped to support the operative parts, and has mounted in suitable bearings a main driving-shaft B, provided with a suitable belt-pulley B', (shown in dotted lines, Fig. 2,) said shaft having fast thereon a gear $B^2$ in mesh with a similar gear $B^3$, fast on an auxiliary shaft $B^4$, the opposite end of the said shaft having secured to it a bevel-gear $B^5$, (see dotted lines, Fig. 2,) in mesh with a like gear $B^6$, fast on a shaft $B^7$, upwardly extended and rotatable in a suitable bearing 2, forming part of a bracket 3, secured to the top or head A' of the loading apparatus. This head A' has rigidly secured thereto, near its upper end, a laterally-extended bracket $a$, on which is mounted the supporting-frame C of the assorting and distributing apparatus. The said frame is provided with feet $c\ c'$ to rest and slide upon the top of the bracket $a$, the frame being held in place and guided in its movements by suitable ears $c^2$, fast on the frame, and by a bearing $a'$ on the bracket, and in which the foot $c$ is adapted to slide.

A partially-threaded rod $a^2$ is extended loosely through a rearwardly-extended foot $c^3$ at each side of the frame C and into the bracket $a$, a spring S surrounding the rod between its head and the foot to normally move the frame and parts supported thereby inwardly or toward the head A'.

The standards $c^4$, which extend upwardly from each side of the frame C, are provided each with a series of holes $c^\times$ to support a cross-bar $c^5$, suitable pins $c^6$ being inserted into the ends of the cross-bar extended through opposite holes in the two standards, whereby adjustability in the height of the cross-bar is obtained.

As herein shown the hopper D and the guide-troughs D', leading therefrom, are rigidly secured together or forming part of a casting pivoted at $d^\times$ to a part of the frame C, the other end of the combined hopper and guide-troughs resting on and being supported by the cross-bar $c^5$ in such manner that the bottom $d$ of the hopper and the troughs incline downwardly and rearwardly toward the pivotal point. The bottom $d$ of the hopper is shown best in Fig. 6 as convexed or crowned from one to the other side and surrounded at its upper end and sides by upturned walls $d'$ $d^2$, respectively, the side walls being continued down to the pivotal point of support, and, as clearly shown in Fig. 4, the lower end of the hopper-bottom is also convexed longitudinally, as at $d^3$, to facilitate the passage of the nails to the guide-troughs. The guide-troughs D' are formed, as herein shown, by a series of dividing-walls $d^4$ $d^5$, radiating from the lower end of the hopper, the walls $d^4$ being shown as higher than the walls $d^5$ and alternating therewith to assist in placing the nails in the troughs in the direction of their lengths. Should a nail pass from the hopper onto the walls in such manner as to rest upon its top, means have been provided for turning or directing it to fall longitudinally into the troughs, and preferably are formed upon the tops of the higher walls $d^4$ a series of projections $d^6$, irregularly arranged or staggered, as clearly shown in Figs. 3 and 5, to engage a nail presented sidewise and turn it in proper position into the troughs. Instead of using the projections $d^6$, as shown in Fig. 3 and on a portion of the dividing-walls in Fig. 5, substantially the same result might be attained by notching the walls, as at $d^7$, Figs. 3 and 5, to thus form catches to turn the nails lengthwise.

The supporting-frame C is vibrated, as will be hereinafter described, such vibration tending to shake the nails from the hopper into the guide-troughs, and thence to the guideways now to be described.

A series of guideways E are mounted in parallelism upon the frame C beneath the hopper and guide-troughs, there being preferably one such guideway for each trough, the guideways being connected together by suitable tie-rods $e^\times$, extended transversely across the frame and provided with ferrules or collars $e'$ between and to separate the guideways, the latter forming a species of gridiron.

The guideways E have each a V-shaped groove in their upper sides to receive and direct the nails longitudinally, and it is necessary to provide means for directing the nails accurately from the ends of the guide-troughs into the guideways in such manner that they will enter the guideways in the direction of their length.

Referring to Fig. 4, it will be seen that the guideways E incline forwardly and downwardly, and at their rear upper ends is erected a guard-wall $e^2$, extending sufficiently high to prevent the nails, as they leave the guide-troughs D', from escaping, and between the ends of each two guideways E we have interposed partitions $e^3$ and $e^4$, forming with the wall $e^2$ a nail-director to direct the nails, as they fall from the ends of the guide-trough, into proper longitudinal position on the guideways E. The division-partitions $e^3$ $e^4$ are concaved at their upper edges and preferably beveled or rounded, and, as shown in Fig. 4, the tops of the partitions $e^3$ are higher than the tops of the partitions $e^4$ and arranged in alternation throughout the length of the nail-director to tip nails falling crosswise onto the tops of the walls, so that they will drop by gravity lengthwise between the partitions and so dispose themselves to properly enter the guideways E.

Referring to Fig. 3, it will be seen that the division-partitions of the nail-director are so arranged as to practically form continuations of both the ends of the guide-troughs D' and the upper rear ends of the guideways E.

A shaft $f$ is extended beneath the supporting-frame C and mounted in bearings $f'$, adjustably secured by set-screws $s$ in the open heads $f^2$ of bolts $f^3$, passed through the bracket $a$, and held in place by suitable nuts 5 and 6, the screw $s$ providing means for adjusting the shaft $f$ toward or away from the front of the apparatus. A bevel-gear $f^4$ (see Fig. 1) is secured to one end of the shaft $f$ with its teeth in mesh with a like gear $b$, fast on the upper end of the shaft $B^7$, before referred to, rotation being thus transmitted to the shaft $f$, which has fast thereon two tappet-cams $f^5$, each of said cams, as shown in Figs. 1 and 4, having two tappets which are adapted to strike one after the other a projection 20, adjustably secured by set-screws $s^2$ to the frame C at each side thereof, the shaft being rotated in the direction of the arrow 25, Fig. 4, adjustment of the projections 20 regulating the stroke of the frame C.

The rotation of the shaft $f$ acts to vibrate the supporting-frame and parts sustained thereby, the springs S on rods $a^2$ moving the frame in the opposite direction and maintaining the projections 20 in position to be engaged by the tappets as they rotate, this rapid shaking or vibration of the hopper, guideways, and intervening connections serving to jiggle or shake the nails down into the guideways and to the front or delivery ends of the latter.

It is necessary to release as a series the nails lying at the delivery ends of the series of guideways, in order that they may fall as a series, each into a proper pocket of a transferrer, and for this purpose we have provided each guideway with a combined detent and let-off, the let-off being moved to allow the endmost nail in each guideway to escape, while the detent holds back the second and following nails until the let-off is returned to operative position, as will be described.

Brackets $g$ are erected upon the supporting-frame, at each side thereof, near the delivery ends of the guideways, to sustain bearings $g'$, in which is mounted a rock-shaft $g^2$, extended above and across the guideways E and provided with rocker-arms $g^3$, having ears (see Fig. 3) slotted at $g^4$ to receive therein the lower ends of links 60, rigidly secured to a cross-head 70 on the vertically-reciprocating plunger $A^{10}$ of the loading apparatus, (see Fig. 1,) collars 75 on the ends of the links beneath the rocker-arms $g^3$ acting to lift the latter when the plunger is raised, while collars 80 on the links above the rocker-arms depress them when the plunger is lowered, thus rocking the shaft $g^2$ intermittingly.

Collars $g^5$, secured to the rock-shaft, support short transverse rods $g^6$, to which are secured at the front and rear of the rock-shaft like cross-arms $g^7$, extending above the series of guideways E.

Headed pins $g^8$ and $g^9$ (see Fig. 4) are extended loosely through holes in the front and rear cross-bars $g^7$, respectively, as clearly shown in Fig. 4, the lower ends of the pins being preferably enlarged and of conical shape to at times extend into the paths of or directly bear upon the nails in the guideways, the rocking of the shaft $f$ causing one set of pins, as $g^8$, constituting let-offs, to descend into the paths of the endmost nails, while the other set, $g^9$, or the detents are elevated therefrom, the pins being surrounded between their lower enlarged ends and the cross-bars $g^7$ by suitable springs $s^\times$, whereby they are permitted to yield in the direction of their length. When the let-offs are in operative position, (shown in Fig. 4,) the detents $g^9$ will be elevated, and when the let-offs are elevated to permit the escape of the endmost nails held by them at the ends of the guideways the detents are depressed to contact with some portion of the second nail in each guideway to retain it and the following nails until the let-offs have been again moved into operative position, and it will be understood that the distance between each let-off and its coöperating detent is sufficient to permit a single nail to lie in the guideway between them, the let-off being always moved down in front of a nail, while the detent may be moved in front of the nail or in contact therewith at any point of its length.

Some of the nails will travel down the guideways head first and others point first, and it is necessary that all the nails should enter the transferrer head foremost in this embodiment of our invention, and for this purpose we have applied a nail-reversing mechanism at the delivery ends of the guideways E and between them and the transferrer, to be described.

The head $A'$ of the apparatus has secured thereto a bed-plate $h$, having a series of slots $h'$ therein below and in alinement with the guideways E, (see Figs. 4 and 8,) and said bed-plate has upon its upper side a series of partitions $h^2$, forming the side walls of the upper portions of the slots $h'$, extensions $h^3$ of the partitions $h^2$ running up for a short distance between the ends of the guideways, for a purpose to be described. Short pins $h^\times$ extend from one partition $h^2$ to another across the slotted openings $h'$ in front of the ends of the guideways and in the plane thereof, or a single rod may be extended through the partitions from one to the other side of the bed-plate $h$. Now if a nail N (shown in full lines, Fig. 8) comes down a guideway head first it will tip on the edge of the latter and will fall between the pin $h^\times$ and the guideway head first through the slot $h'$; but if the nail comes point first it will shoot along over the pin $h^\times$, its heavier head end preventing it from tipping over the edge of the guideway E. When the head of the nail clears the guideway, as shown in dotted lines at N', Fig. 8, the nail will tip on the pin $h^\times$ with its head end down, and it will also fall head first through the slot $h'$. The pins $h^\times$ thus act to reverse those nails which come down the guideways point foremost, causing them to drop head first through the slots $h'$, while the nails coming down the guideways head first will fall at once head downward through the slots.

It is desirable to prevent the nails from overshooting the reversing-pins $h^\times$, and this is accomplished by imposing a stop $i$ in front of the paths of the nails, such stop being so distanced from the pins $h^\times$ that the nails presented point first must tip downward between the pins and the ends of the guideways.

As nails vary in length and shape it is preferable to make the stop $i$ adjustable, and for this purpose the stop $i$ is made as a long bar extending across the bed-plate $h$ and provided with threaded bosses $i'$ to receive therein threaded shafts $i^2$, rotatable in but held from longitudinal movement by bearings $i^3$ on the top of the bed-plate, said shafts having, as shown, bevel-gears $i^4$ fast thereon in engagement with like gears $i^5$, fast on a connecting-shaft $i^6$, mounted in bearings $i^7$ on the head $A'$, one of the shafts $i^2$ being extended to receive a hand-wheel $i^8$, by which it may be turned, the two ends of the bar $i$ being moved uniformly through the connecting-shaft $i^6$ to adjust said stop toward or from the reversing-pins $h^\times$. The bar or stop $i$ slides on the bed-plate and is grooved upon its under side to direct it. A cross-bar $h^4$ on the bed-plate beneath the guideways provides a bearing upon which the latter rest as they are longitudinally reciprocated, the under sides of the guideways being shown at $E^{10}$ in Figs. 4 and 8 as somewhat beveled for that purpose.

It is possible that the nails may sometimes fall off the guideways E, and to prevent their getting into and clogging or otherwise damaging the mechanism below we have attached to the frame C below the guideways a shallow pan or receptacle $C^{10}$, having an open top, which receptacle catches the nails which may drop from the guideways, and from which they can be removed from time to time. Beyond the lower end of the receptacle $C^{10}$ the extensions $h^3$ of the partitions $h^2$ on the bed-plate cover the spaces between the guideways E and prevent nails from falling at such points.

Below the slotted plate or grid $h$ and connected thereto a series of passages $k$, having converging side walls, lead from the slots $h'$ and open at their lower ends into the transferrer, herein shown as a series of blades or wings $m$, mounted upon a shaft $m'$ to rotate within a cylindrical casing $m^2$, rigidly secured to the head $A'$ of the loading apparatus and extended beneath the grid $h$, the cylindrical shell or casing $m^2$ having a series of openings therein to register with the lower ends of the passages $k$. Each of the wings or blades $m$ is provided with a series of pockets $m^{\times}$, each large enough to contain a single nail, the pockets in each blade corresponding in number to the number of guideways E and being equal to the number of guideways and intervening passage-ways $k$.

At one end of the shaft $m'$ is secured a disk $m^3$, (see dotted lines, Fig. 1,) having a series of projections or pins $m^4$ on its outer face, four of such projections being herein shown to correspond to the number of blades and adapted to be engaged one after another by a spring-controlled pawl $n$, (see dotted lines, Fig. 1,) pivoted at $n'$ on a vertical reciprocating plunger $A^{10}$, movable in the head of and forming a part of the loading apparatus, and forming no part of this invention.

At each reciprocation of the plunger the transferrer will be rotated one-quarter of a turn, as herein shown, and supposing a series of nails to have been delivered to the pockets $m^{\times}$ (shown uppermost in Fig. 4) the next movement of the transferrer in the direction of arrow 100 will present a new set of pockets below the passages $k$, the nails in the first set of pockets being retained in place therein by the cylindrical shell $m^2$ as the transferrer rotates, and when a half-revolution has been made for any particular blade the series of nails in the pockets therein will be discharged by gravity through openings in the lower part of the shell into distributing-tubes $t$ (shown in Fig. 1 in dotted lines) to be conveyed thence to the loading mechanism.

Inasmuch as the nails will all be delivered from the guideways E to the passages $k$ with their heads down, as has been described, it is necessary in the apparatus herein shown to turn the nails end for end before they enter the distributing-tubes $t$, and the transferrer just described performs this office, so that the nails will descend the distributing-tubes point foremost.

The lower ends of the distributing-tubes are usually arranged in a fixed curve, while the shapes of the heels to be loaded from such tubes vary both as to size and the degree of curvature, and it is difficult to adapt the tubes to these changes in the heels, and for this purpose we have provided detachable auxiliary tubes or throat-pieces adapted to be connected to the lower ends of the fixed main distributing-tubes and capable of adjustment to compensate for variations in the sizes and curvatures of the heels.

In Fig. 1 are shown two of the auxiliary tubes or throat-pieces $r$ in position, and in Fig. 7 is shown in perspective an enlarged detail of one of the tubes.

Referring to Fig. 7, the auxiliary tube or throat-piece $r$, as shown, is flattened and substantially V shape, the inner side of the throat-piece being preferably curved outward toward its lower end, as at $r'$, to permit the nails passing therethrough to straighten up and be presented to the heel or loader in a vertical position. The upper end of the throat-piece is provided with a spring-clip $r^2$, the arms of which are provided with a series of corrugations, three being herein shown, whereby the throat-piece may be readily attached to the lower end of the main distributer-tube and adjusted as to its position thereon, in the present instance three separate adjustments of the throat-piece being possible, according to the corrugations used in the clip.

As the auxiliary throat-pieces can be bent in or out or moved bodily relatively to their supporting distributing-tubes $t$, they can be adjusted to conform to the size or curvature desired for the heel to be loaded.

The let-off $g^8$ constitutes an automatic discharging device for the endmost nail of a guideway, and the series of let-offs act simultaneously to effect the discharge of a series of nails, but instead of the particular discharging device shown any other suitable device may be employed to enable all the endmost nails to slide from the delivery end of the guideways to be acted upon by a transferrer and be delivered point foremost into suitable guiding-tubes.

The invention is not restricted to the precise construction and arrangement of parts herein shown and described, for the same may be modified or rearranged in various particulars without departing from the spirit and scope of our invention.

Having described the invention, what is claimed as new, and desired to be secured by Letters Patent, is—

1. In a nail assorting and distributing apparatus, a series of guideways to receive nails laid thereon in the direction of their length, means to cause the said nails to travel along said guideways toward their delivery ends, means to automatically discharge the endmost nails of said guideways, a rotatable transferring device having a series of pockets, one for each guideway, said pockets being arranged side by side parallel to the axis of motion of said transferrer, and means to move said transferrer to enable it to deliver a series of nails point first into delivering-tubes, substantially as described.

2. In a nail assorting and distributing apparatus, a series of guideways to receive nails in the direction of their length; means to supply nails to said guideways; and a stationary reversing device located at the delivery ends of said guideways, to form a temporary fulcrum for and reverse those nails which are presented thereto point foremost, whereby all the nails will have their heads pointing in the same direction when discharged, substantially as described.

3. In a nail assorting and distributing apparatus, a series of guideways having each a longitudinal groove therein to receive nails in the direction of their length, means to feed the nails along said guideways; a grid having a series of partitions, one for each guideway; an adjustable stop arranged in front of and at a short distance from the delivery ends of the guideways; and a pin or projection between the stop and the end of the guideways and crossing said partitions, whereby such nails as leave the latter guideways point foremost will be turned by gravity on said pin or projection with their head ends directed downwardly, the stop preventing overrunning of the nails, substantially as described.

4. In a nail assorting and distributing apparatus, a hopper to receive nails in bulk; a series of guide-troughs communicating with the hopper, to convey the nails therefrom in the direction of their length; a series of inclined guideways below the open ends of the guide-troughs, and a directing device between said troughs and guideways, to supply the nails lengthwise upon the latter as they leave the guide-troughs, substantially as described.

5. In a nail assorting and distributing apparatus, a hopper to receive nails, said hopper having an inclined bottom and open at its lower end; a series of guide-troughs radiating from the open end of the hopper, to receive the nails therefrom; a series of guideways having their upper ends below the open lower ends of the guide-troughs, and means to cause the nails to fall lengthwise upon the guideways, substantially as described.

6. In a nail assorting and distributing apparatus, a nail-hopper having an inclined bottom; radiating guide-troughs leading from the hopper and along which the nails pass lengthwise; a series of guideways to receive the nails from the said troughs; a transferrer to which the nails are to be delivered from the guideways; and means to vibrate said hopper, trough and guideways, to cause the nails to be fed to the transferrer, substantially as described.

7. In a nail assorting and distributing apparatus, a hopper to receive the nails in bulk; a series of guideways to receive the nails lengthwise; means to convey the nails from the hopper to the guideways; a nail-reversing device located at the delivery ends of the guideways, to reverse all those nails which are delivered from the guideways point foremost, and a transferrer having a series of pockets arranged side by side in a line parallel to the axis of motion of the transferrer to receive all the nails from all the said guideways with their heads all in one direction, and means to move said transferrer to turn said nails over and deliver them point first into position to be distributed, substantially as described.

8. In a nail assorting and distributing apparatus, a hopper to receive nails; a series of guideways to receive the nails lengthwise and to deliver them to a transferrer; a transferrer to receive a series of nails from the ends of said guideways with their heads all pointed in the same direction, devices to move said transferrer into position to discharge said nails point foremost to be distributed; and a nail-reversing device between the delivery ends of the guideways and the transferrer, to reverse those nails which arrive at the ends of the guideways point foremost, substantially as described.

9. In a nail assorting and distributing apparatus, a series of inclined guideways to receive the nails lengthwise; means to shake the guideways to cause the nails to move toward their lower ends; a let-off for each guideway, to enable a series of nails to be delivered therefrom singly; a detent coöperating with each guideway, to retain the second and following nails thereon while the adjacent let-off is moved to let off the series of nails at the extremities of the guideways, and means to operate the let-offs and detents alternately, substantially as described.

10. In a nail assorting and distributing apparatus, a nail-hopper having a convexed bottom and inclined from its upper to its lower end; a series of trough-like passages leading from the lower end of the hopper, to receive the nails; inclined V-shaped guideways to which the nails are supplied lengthwise, to be discharged thence to the distributers; and a reversing device at the lower ends of the guideways, to reverse those nails presented thereto point foremost, whereby all the nails will be discharged with their heads in one direction, substantially as described.

11. In a nail assorting and distributing apparatus, a hopper for the nails, a series of guide-troughs leading therefrom, to receive the nails in the direction of their length, and means to turn nails passing from the hopper and presented sidewise to said troughs to thereby direct them into the guide-troughs lengthwise, substantially as described.

12. In a nail assorting and distributing apparatus, a hopper, a series of nail-receiving guide-troughs rigidly attached thereto, a pivotal support for said guide-troughs, and means to vary the inclination of said hopper and guide-troughs, substantially as described.

13. In a nail-distributing apparatus, a series of distributing-tubes, and independent throat-pieces adapted to be adjustably attached directly to the lower ends of and be supported by said tubes, to vary the points of delivery of the nails, substantially as described.

14. In a nail-distributing apparatus, a series of distributing-tubes, and throat-pieces adapted to be attached to the lower ends of said tubes, the inner sides of said throat-pieces being outwardly curved at their lower ends, to permit nails passing therethrough to be presented in a vertical position, substantially as described.

15. A throat-piece outwardly curved toward its lower end and provided with a spring-clip, whereby it may be adjustably attached to the end of a distributing-tube, substantially as described.

16. A throat-piece for distributing-tubes, having a spring-clip at its upper end, corrugated to embrace the end of a distributing-tube and be adjusted thereon, substantially as described.

17. A throat-piece for distributing-tubes, flattened, and outwardly curved toward its lower end, to permit nails passing therethrough to straighten up and be presented in a vertical position, substantially as described.

In testimony whereof this specification is signed in the presence of two subscribing witnesses.

ALVIN D. ELLIOTT.
JOHN E. GLIDDEN,
*Administrator of the estate of Charles W. Glidden.*

Witnesses:
JOHN C. EDWARDS,
AUGUSTA E. DEAN.